United States Patent [19]
Clark

[11] 3,753,314
[45] Aug. 21, 1973

[54] SCREEN FOR A TERRARIUM
[76] Inventor: Earl R. Clark, P. O. Box 914, Graham, Tex. 76046
[22] Filed: Feb. 28, 1972
[21] Appl. No.: 229,688

[52] U.S. Cl.................... 47/34.11, 215/100, 215/47
[51] Int. Cl................................................ A01g 9/02
[58] Field of Search.................. 47/34, 37, 41.11, 47/41.13, 1.2; 119/1; 206/46 E; 215/100, 47

[56] References Cited
UNITED STATES PATENTS
| | | | |
|---|---|---|---|
| 2,361,029 | 10/1944 | Heinl | 47/37 |
| 3,147,569 | 9/1964 | Murgvia | 47/37 |
| 2,639,549 | 5/1953 | Wubben et al. | 47/1.2 |

FOREIGN PATENTS OR APPLICATIONS
1,416,594  9/1964  France................... 47/34

Primary Examiner—Robert E. Pulfrey
Assistant Examiner—R. T. Rader
Attorney—John F. Booth

[57] ABSTRACT

A terrarium or the like for use in cultivating and exhibiting plants having a transparent container with a transparent closure member sealing said container, an aluminum mesh screen dividing the interior of said container into a first and second area, the first area being located below the screen when the container is in its orientation of use, the first area containing moist soil, the side of said screen adjacent said second area having decorative cover attached thereto and plants with roots extending into said soil through said ground cover and the screen.

5 Claims, 2 Drawing Figures

PATENTED AUG 21 1973          3,753,314

3,753,314

SCREEN FOR A TERRARIUM

BACKGROUND OF THE INVENTION

The present invention relates to terrariums and the like and more particularly to new and improved terrariums of the sealed type having a mesh screen attached to the interior of the terrarium to span across the terrarium.

DESCRIPTION OF THE PRIOR ART

In the study of the growth of plants in sealed transparent containers such as terrariums, it has been a general practice to assemble these devices by first placing a quantity of granular material of a desired moisture content in a transparent container, then inserting plants into this material and finally sealing the open end of the container. Although such devices have served their purpose, they have not proved entirely satisfactory under all conditions of service for the reason that considerable difficulty has been experienced when terrariums are moved or bumped due to the fact that the plants and granular material can be dislodged or uprooted. Also, difficulties have been encountered in anchoring and supporting decorative covers on the surface of the soil without affecting the growth of the plants in the terrarium.

SUMMARY OF THE INVENTION

The general purpose of this invention is to provide an improved sealed terrariam which embraces all of the advantages of similarly employed sealed terrariums and possesses none of the aforementioned disadvantages. To attain this, the present invention contemplates the use of a unique non-corrosive mesh screen mounted in the interior of the sealed terrarium whereby the granulr material is retained in place in the terrarium and on which decorative cover can be supported and attached.

OBJECTS OF THE INVENTION

An object of the present invention is the provision of an improved sealed terrarium.

Another object of the present invention is the provision of an improved sealed terrarium with a mesh screen for retaining the granular material in place in the terrarium during transport and use.

A further object of the present invention is the provision of an improved sealed terrarium in which the decorative cover is held in place in the terrarium.

Still another object of the present invention is the provision of an improved sealed terrarium with a granular material retainer which does not hinder the growth and propagation of plants within the terrarium.

Other objects and many of the attendant advantages of this invention will be readily appreciated by those of ordinary skill in the art as the same becomes better understood by reference to the following detailed description when considered in connection with the accompanying drawings in which:

DESCRIPTION OF THE PREFERRED EMBODIMENT

Figure 1:
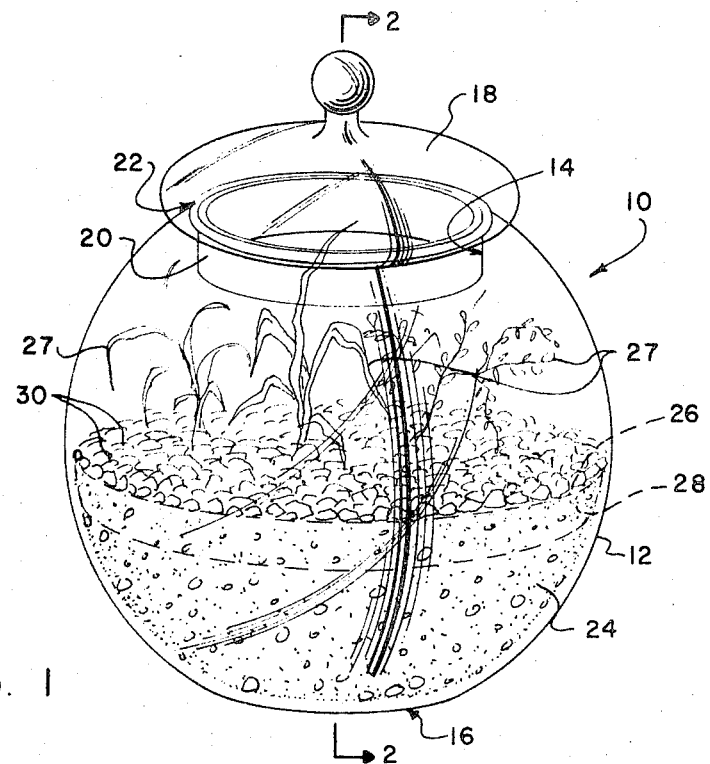
FIG. 1 is a perspective view of the improved terrarium of the present invention.

Referring now to the drawings, wherein like reference characters designate like or corresponding parts throughout the several views, there is shown a sealed terrarium which, for purposes of description, is identified by reference numeral 10. This terrarium 10 is assembled from a container 12, which in the present embodiment is formed from transparent glass material so that the interior of the container 12 can be easily viewed. The container 12 has a circular opening 14 positioned at the opposite end from a flattened support surface 16 provided to enable the container 12 to rest at equilibrium on a flat surface. A dome-shaped closure member 18 with a downwardly extending cylindrical skirt 20 is provided to seal the opening 14 of the container 12. To aid in the sealng of the container 12, a quantity of sealing adhesive 22 can be applied annularly around the junction of the closure member 18 and container 12.

The terrarium 10 illustrated is of a type which is assembled with a quantity of granular material 24 in which plants will root and grow. In addition, moisture is added to the material 24 and plants 27 are planted therein. Since the terrarium 10 is of the sealed type, the moisture in the plants will be absorbed by the roots of the plants and released into the upper portion of the terrarium The moisture will subsequently return to the material 24 and be re-utilized by the plants making the terrarium self-sufficient.

Due to the fact that the terrarium 10 is sealed, it is impossible to repair or rearrange the material 24 and plants 27 therein, without breaking the seal 22 of the terrarium. This impossibility becomes important when considering the fact that the plants 26 and granular material 24 can become disoodged when the terrarium 10 is moved or transported.

Figure 2:
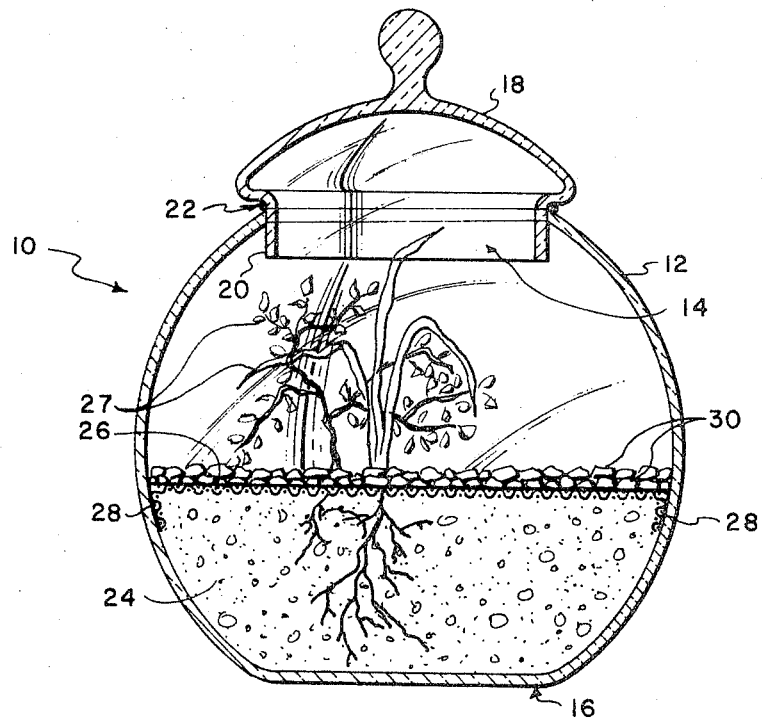
FIG. 2 shows a section of the device taken on line 2—2 of FIG. 1 looking in the direction of the arrows.

To eliminate this problem, the terrarium is provided with a mesh screen 26. This screen is preferably formed from a ⅛ inch aluminum (or other non-corrosive material) wire mesh which has been coated with adhesive and placed in contact with the granular material 24 to adhere said material 24 to the screen 26. The screen 24 is then formed to extend across the interior of the container 12 and is provided with flanges 28 which are adhesively attached to the interior walls of the container 12. As can be seen in FIG. 2, this mesh is positioned on the upper surface of the material 24 to hold the materials in place. The plants 27 are inserted through the mesh of the screen 26 or openings can be formed therein for larger plants. Adhesively attached to the upper surface of the screen 26 is a ground cover material 30, which can be formed of rocks, moss and the like. In this manner the screen 26 is completely hidden from view, yet retains the ground cover material 30, plants 27, and granular material 24 in place in the terrarium while allowing ariation of the soil, permitting moisture transfer to and from the soil, and permitting rooting and sprouting through the screen so that the plants can flourish and propagate within the terrarium.

From the foregoing it can be seen that the terrarium structure disclosed provides a means for preventing disruption of the invention of the terrarium without detracting from the appearance or hampering the performance thereof.

It should be understood, of course, that the foregoing disclosure relates to only a preferred embodiment of the invention and that numerous modifications or alterations may be made therein by those of ordinary skill in the art without departing from the spirit and scope of the present invention as set forth in the appended claims.

What is claimed and desired to be secured by United States Letters Patent is:

1. A terrarium for growing and exhibiting plants and the like comprising:
   a. a container defining an interior volume, said container having an opening at one end thereof providing access to the interior of said container, support means on said container for supporting said container, a transparent portion on said container for viewing the interior thereof,
   b. closure means sealing said opening of said container,
   c. screen means permanently attached to the interior of said container and dividing said interior into first and second portions,
   d. a quantity of moist granular growing medium filling said first portion for planting said plants and the like,
   e. ground cover means attached to and covering said screen on the side of said screen adjacent said second portion, and
   f. downwardly turned tabs on said screen means and adhesive attaching said tabs to the interior of said container wherein the terrarium may be shipped without dislodgement of the growing medium.

2. A terrarium as defined in claim 1 wherein said screen means is a mesh.

3. A terrarium as defined in claim 2 wherein said screen means is constructed from non-corrosive material.

4. A terrarium as defined in claim 2 wherein said screen means is constructed from aluminum material.

5. A terrarium as defined in claim 1 additionally comprising sealing means for sealing between said closure and said container.

* * * * *